March 9, 1943.　　　F. C. FRANK　　　2,313,223
BRAKE
Filed March 8, 1940　　　　3 Sheets-Sheet 1

INVENTOR.
FREDERICK C. FRANK
BY M. W. McConkey
ATTORNEY.

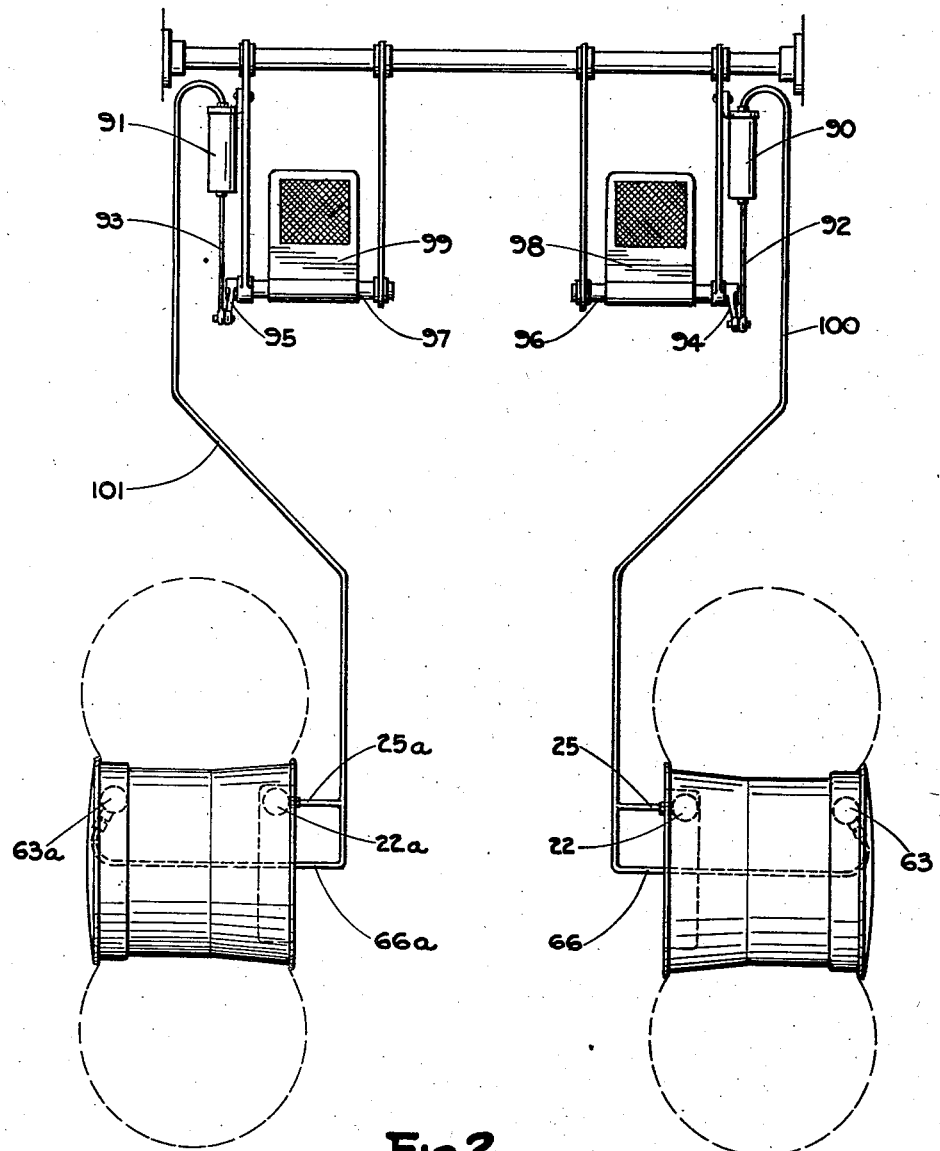

March 9, 1943. F. C. FRANK 2,313,223
BRAKE
Filed March 8, 1940 3 Sheets-Sheet 3
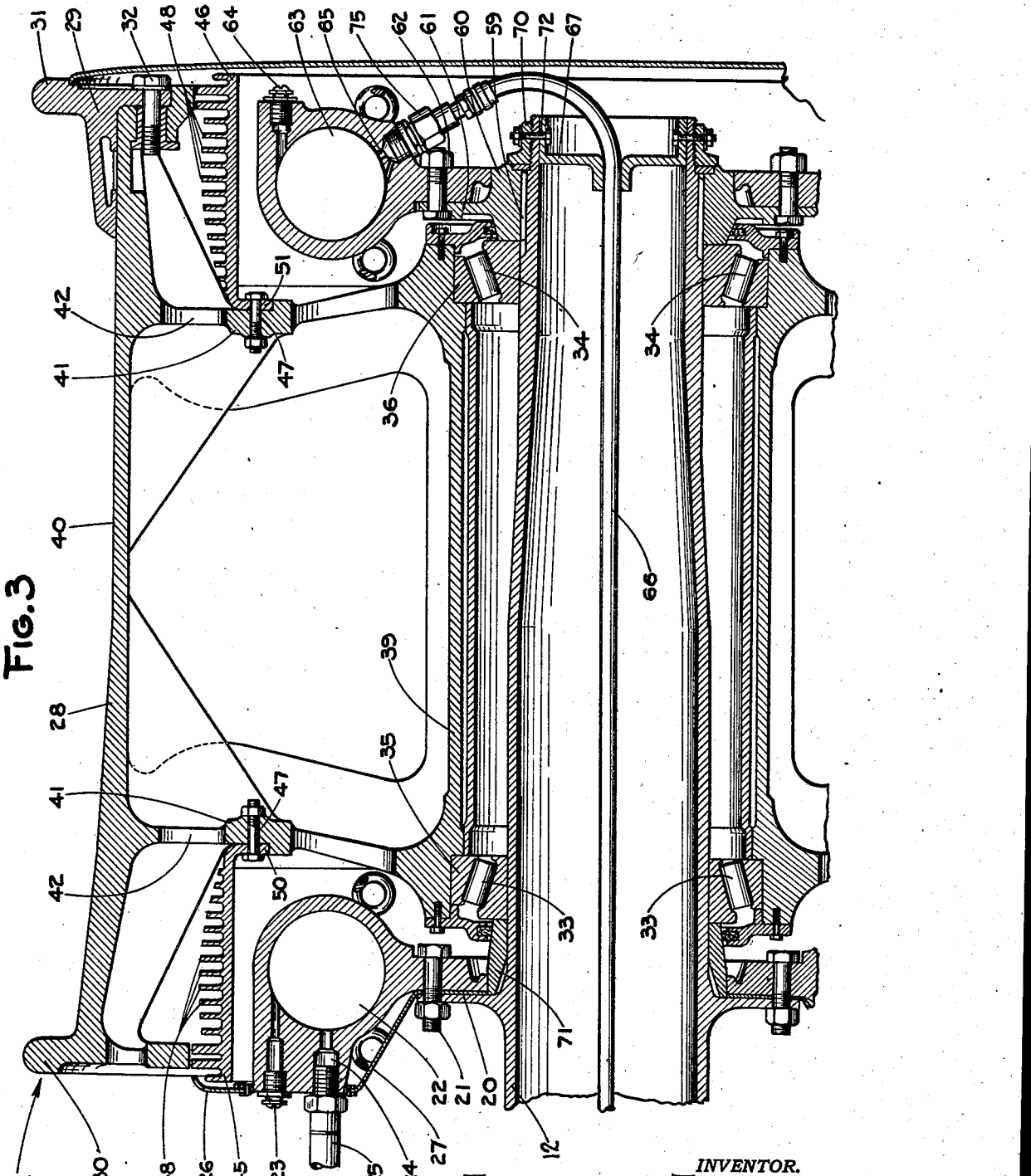

Patented Mar. 9, 1943

2,313,223

UNITED STATES PATENT OFFICE 2,313,223

BRAKE

Frederick C. Frank, South Bend, Ind., assignor to Bendix Aviation Corporation, South Bend, Ind., a corporation of Delaware Application March 8, 1940, Serial No. 322,881

7 Claims. (Cl. 188—152)

This invention relates to brakes, particularly to brakes for aircraft.

In modern airplane designing, it has been found desirable to provide means for lessening the air resistance occasioned by the air blowing against the surface of wheels and landing gear of planes while they are in flight. Thus it has become common to retract the landing gear (i. e., to fold the wheel unit under the plane after the take-off). With the bicycle type landing gear the only folding possible is straight back, allowing a considerable portion of the wheel to protrude.

Use of a cantilever axle for each wheel obviates this problem since the wheel unit may then be folded in any direction, the practical method being to fold it up under the corresponding wing of the airplane. A satisfactory and desirable streamlining effect is thus secured.

The cantilever axle demands, however, a new approach to the brake problem. Due to the large amount of heat generated by the friction required for stopping the airplane in a short enough space once it has been landed, a large amount of braking surface must be provided. To do this, dual brakes have been used, one on each side of each airplane wheel. This supplies a relatively large friction surface for the brakes without requiring inordinately large wheels and brake drums.

With the bicycle type landing gear, the dual brakes could be provided relatively easily, since one brake was fixed to each fork of the gear, and the torque developed by each brake was transmitted to its corresponding fork. When it was desired to remove or attach a wheel, the landing gear and front end of the plane could be raised and the wheel and axle unit removed or attached from below.

With the use of a cantilever axle, the provision of a dual brake assembly presents a more difficult problem. The outer brake (i. e., one away from the vertical axle or gear) must be secured in some manner to the end of the axle which protrudes through the wheel, and must be removed every time the wheel is removed. This necessitates both a method for securing the outer brake to the rest of the wheel assembly and a means for removing the brake and wheel without undue complications.

Therefore, an object of my invention is to provide means for securing the outer brake to the cantilever axle.

A further object is to provide means for bringing the hydraulic line through the axle to the outer brake and attaching it to a wheel cylinder therefor in such manner that it may be detached from the brake without allowing leakage of liquid from or air into the hydraulic system.

The above and other objects and features of my invention will be further evident in connection with the following detailed description. In the accompanying drawings, submitted to illustrate but not to limit my invention:

Figure 2 is a diagrammatic sketch showing a hydraulic brake system applied to an airplane and including the dual wheel brakes of Figure 3;

Figure 3 is a vertical cross section of the wheel and brake assembly; and

Figure 1:
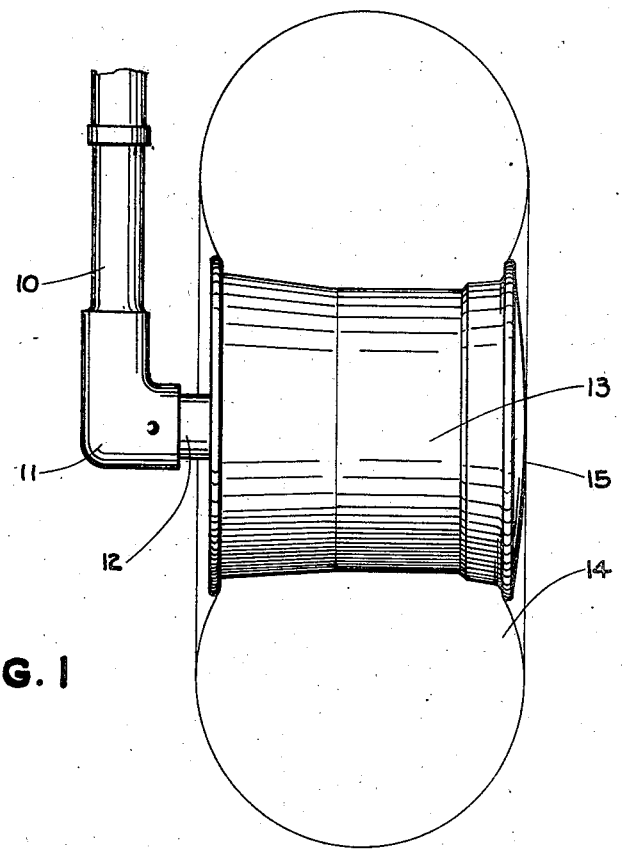
Figure 1 is a front view of an airplane wheel and axle assembly, the axle being of the above-mentioned cantilever type.

Referring now to the parts specifically, Figure 1 shows a cantilever axle and wheel assembly for an airplane. Extending down from the frame of an airplane, not shown, is a vertical portion 10 of an axle or strut, which is connected by suitable means, as an L joint 11, to a horizontal or wheel carrying tubular axle 12. Arranged to rotate about the axle 12 is a wheel 13, carrying a tire 14. A fairing plate 15 is pressed into the outer portion of the wheel to serve as a protective covering against dust and other extraneous matter.

Figure 2 shows diagrammatically the hydraulic brake system of an airplane with dual brakes on each wheel constructed and assembled according to my invention. A pair of master cylinders 90 and 91 are arranged to be actuated by the manipulation of rods 92 and 93 which are attached respectively to levers 94 and 95. The levers 94 and 95 are attached to rotatable shafts 96 and 97 adapted to be turned by manipulation of pedals 98 and 99. Actuation of the master cylinders 90 and 91 forces pressure fluid through conduits 100 and 101 respectively to branch conduits thereof, which conduct the fluid to wheel cylinders. Conduit 100 has a branch conduit 25 leading to a wheel cylinder 22 and a branch conduit 66 leading to a wheel cylinder 63. Conduit 101 has a branch conduit 25a leading to a wheel cylinder 22a and a branch conduit 66a leading to a wheel cylinder 63a. The pressure fluid entering the wheel cylinders under the force applied at the master cylinders spreads the brake shoes to apply the brakes in a manner well known to the art and not believed to require detailed description here.

In Figure 3, an axle and wheel assembly is shown in cross section. The same assembly is used for both wheels and only one need be described. The tubular axle 12 is provided with a flange 20 to which is secured by suitable means, as shown at 21, the hydraulic wheel cylinder 22. The cylinder 22 is provided with a bleeder plug 23 and a port 24 to which is connected the conduit 25 connected at its other end to the hydraulic master cylinder 90 (see Figure 2). Fluid entering cylinder 22 from conduit 25 actuates brake shoes (not shown) to apply the brakes. Thin covers shown at 26 and 27 protect the inner side of the wheel and brake assembly from dust and dirt.

The elements thus far described constitute the means for applying the inner brake of the dual brakes herein shown, that is, the brake nearest the vertical portion of the axle 10.

The wheel 13 is cast in two sections 28 and 29, section 28 constituting the main body of the wheel. Section 29 is provided with an annular tire engaging rim 40 and has a flange 30 for retaining the inner wall of tire 14, while section 29 of the wheel has a flange 31 for retaining the outer wall of the tire. Sections 28 and 29 of wheel 13 are held together by a plurality of bolts 32 or by other suitable means.

Section 28, or the main body of the wheel, has a hub 39 and side walls 41 with sections 42 cutout to decrease the weight of the wheel.

Roller bearings 33 and 34 are provided, arranged in suitable bearing assemblies, as shown at 35 and 36, to allow the rotation of wheel 13 about stationary axle 12 with a minimum of friction.

The wheel is provided with dual brake drums 45 and 46 having flanges 50 and 51 fixed to the respective side walls of the wheel by a plurality of bolts 47. The brake drums are each provided with a series of cooling fins 48 to facilitate dissipation of the heat generated during braking.

The remainder of the assembly consists of the outer of the dual brakes and the means used for fixing that brake to the axle 12 together with means for actuating the brake.

The axle 12 is provided with a plurality of grooves 59 to receive the complementary projections of a splined brake carrier 60. This brake carrier is provided with an annular flange 61 to which is secured by suitable means, as shown at 62, the hydraulic wheel cylinder 63. The cylinder 63 is provided with a bleeder plug 64 and a port 65, which communicates with the conduit 66. The conduit 66 passes through the hollow center of the axle 12 and is connected to the conventional master cylinder 90, to which is also connected the conduit 25. An annular flexible web or diaphragm 67 near the outer end of the axle supports conduit 66.

When the whole wheel and brake assembly is fitted on the axle, it is maintained in position between the flange 20 of the axle 12 and a retaining nut 70 which is screwed onto the outer end of axle. There is, therefore, an adjustable tension holding, against lateral movement, the elements constituting the wheel and brake assembly. The juxtaposed elements consist, starting at the inner end of the wheel, of the flange 20, an annular spacer 71, bearing assembly 35, the hub 39 of the wheel, bearing assembly 36, the splined brake carrying flange 60, and retaining nut 70. The retaining nut is held against turning by a plurality of bolts 72, which also serve to hold in place the web or diaphragm 67 for supporting the conduit 66 centrally within the axle 12.

When the brakes are desired to be applied, fluid pressure is transmitted from the master cylinder, through conduits 25 and 66, to the wheel cylinders 22 and 63, causing the application of the brakes in a well-known manner.

Figure 4:
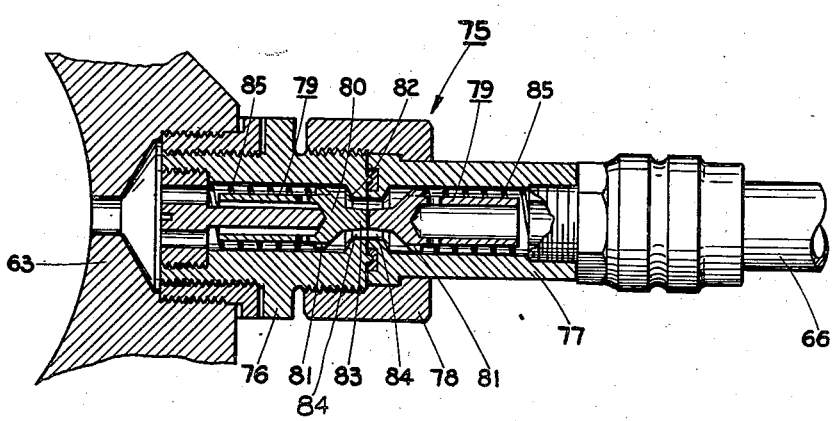
Figure 4 is a cross section showing in detail a valve used to connect the hydraulic line to the outer brake.

Connected between the end of conduit 66 and cylinder 63 is a cut-off valve 75 (shown more clearly in Figure 4), which is arranged to allow disconnection of conduit 66 from cylinder 63 without the loss of liquid or ingress of air into the hydraulic system. This is especially advantageous in view of the necessity, when cantilever axle 10—12 is combined with dual brakes (as shown), of disconnecting the conduit 66 from the cylinder 63 and removing the cylinder and its splined carrier from the axle whenever the wheel 13 is to be removed from the plane. Use of the valve 75 eliminates the necessity for bleeding the hydraulic system each time the wheel is taken off. The valve 75 contains two casings 76 and 77, normally held together by a nut 78. Within each casing is a poppet type valve 79 consisting of a valve head 80 having a passage or passages 81 therethrough, the valve head being adapted to seat on valve seat 82 provided by the respective casing and having a projection 83 on the said head 80 adapted to extend through the open end 84 of the respective casing. The ends 84 of the casings are adapted to be contiguous and in axial alignment when the cut-off valve 75 is assembled. The halves 79 are urged together by spring 85 which bear at one end against the respective casings and at the other end against the respective valve elements. The springs 85, therefore, at all times urge the valves 79 toward the valve seats 82. As long as the device 75 is maintained in assembly, the projections 83 hold the valves 79 off their seats 82. However, when the nut 78 is unscrewed to disconnect the conduit 66 from the wheel cylinder 63, the springs 85 move the valves to close the openings 84 and seal the hydraulic lines from loss of liquid and ingress of air. It will be noted that the valves will gradually move to their seats while the nut 78 is being unscrewed. The threads of the nut 78 are formed sufficiently long to allow the valves to seat before the nut has been disengaged. Thus the nut itself serves as a seal until the valves are allowed to seat.

The device described herein is capable of numerous uses and modifications readily apparent to those skilled in the art without departing from the scope of my invention. It is therefore my desire and intention not to be limited in the scope of my invention otherwise than by the terms of the appended claims. It will be noted that part of the disclosure of this application is claimed in application Serial No. 473,662, filed January 27, 1943, which is a division of this application.

What I claim is:

1. In an airplane brake assembly, a stub axle, a wheel rotatably mounted on the axle, a removable brake carrier splined to the axle on its projecting end, a hydraulic brake applying motor supported by the brake carrier, a hydraulic pressure producing device, a conduit connecting the pressure producing device to the motor, said conduit passing from one side of the wheel to the other through the axle, and a valve interposed in the conduit to automatically close the conduit whenever the connection between the pressure producing device and the motor is cut off to allow removal of the brake carrier.

2. In an airplane brake and wheel assembly, a stub axle, a wheel associated therewith, an inner and an outer brake for said wheel, a splined brake carrier for the outer brake, fluid actuating means for said brakes, conduits for conducting fluid to said actuating means, and valve means associated with one of said conduits allowing the fluid to pass therethrough when the said conduit is connected to the actuating means but preventing the passage of fluid when the conduit is disconnected from the actuating means.

3. In an airplane brake assembly, a stub axle, a wheel rotatably mounted on the axle, a removable brake carrier splined to the axle on its projecting end, a hydraulic brake applying motor supported by the brake carrier, a hydraulic pressure producing device, a conduit connected to the pressure producing device, said conduit passing from one side of the wheel to the other through the axle, means for connecting the conduit to the motor, and means associated with said connecting means for at times sealing the ends of the connecting parts.

4. In an airplane brake assembly, a stub axle, a wheel rotatably mounted on the axle, a removable brake carrier splined to the axle on its projecting end, a hydraulic brake applying motor supported by the brake carrier, a hydraulic pressure producing device, a conduit connected to the pressure producing device, said conduit passing from one side of the wheel to the other through the axle, means for connecting the conduit to the motor, and means preventing the admission of air to the hydraulic system when the conduit and motor are disconnected.

5. In a hydraulic brake for an airplane having a cantilever axle and wheel rotatable thereon, a brake on each side of said wheel, hydraulic means for actuating said brakes, and a conduit connected to one of said hydraulic brake actuating means, said conduit extending through the axle and supported at one end thereof by a flexible diaphragm.

6. In a brake and wheel assembly, a combination of a stub axle, a wheel associated therewith, an inner and an outer brake for said wheel, a splined brake carrier for the outer brake, fluid actuating means for said brakes, and conduits for conducting fluid to said actuating means, with a valve unit interposed in one of said conduits comprising a plurality of chambers having a connecting passage therebetween, valve seats formed in the walls of said chambers at either end of said passage, valve elements reciprocable in said chambers, having projections extending into said passage, and springs associated with said valve elements for urging them toward their respective seats.

7. In a brake and wheel assembly, a combination of a stub axle, a wheel associated therewith, an inner end and an outer brake for said wheel, a splined brake carrier for the outer brake, fluid actuating means for said brakes, and conduits for conducting fluid to said actuating means, and a valve unit interposed in one of said conduits comprising a plurality of chambers having a connecting passage therebetween, valve seats formed in the walls of said chambers at either end of said passage, valve elements reciprocable in said chambers, resilient means associated with said valve elements urging them toward their respective seats, and means positioned between the valve elements for at times holding them off their respective seats.

FREDERICK C. FRANK.